United States Patent [19]

Anahara et al.

[11] E Patent Number: Re. 32,494

[45] Reissued Date of Patent: Sep. 8, 1987

[54] FRICTION SPINNING FRAME

[75] Inventors: Meiji Anahara, Kariya; Shigeru Muramatsu, Okazaki, both of Japan

[73] Assignee: Kabushiki Kaisha Toyoda Jidoshokki Seisakusho, Aichi, Japan

[21] Appl. No.: 937,662

[22] Filed: Dec. 3, 1986

Related U.S. Patent Documents

Reissue of:

[64] Patent No.: 4,606,185
Issued: Aug. 19, 1986
Appl. No.: 769,593
Filed: Aug. 26, 1985

[30] Foreign Application Priority Data

Sep. 3, 1984 [JP] Japan ..... 59-184772
Sep. 3, 1984 [JP] Japan ..... 59-184773

[51] Int. Cl.[4] ..... D01H 1/135; D01H 7/885
[52] U.S. Cl. ..... 57/401; 57/406
[58] Field of Search ..... 57/400, 401, 404, 406, 57/407, 411

[56] References Cited

U.S. PATENT DOCUMENTS 3,757,507 9/1973 Maxham ..... 57/401
4,202,163 5/1980 Turk et al. ..... 57/401
4,367,623 1/1983 Parker et al. ..... 57/401 X
4,420,928 12/1983 Fehrer ..... 57/401
4,502,272 3/1985 Fuchs ..... 57/401
4,514,975 5/1985 Stahlecker ..... 57/401
4,537,021 8/1985 Parker ..... 57/401

*Primary Examiner*—John Petrakes
*Attorney, Agent, or Firm*—Burgess, Ryan and Wayne

[57] ABSTRACT

A friction spinning frame including a pair of twisting rollers disposed substantially in parallel and driven in the same direction to each other at a small gap therebetween to form a yarn forming zone of a valley shaped profile on upper surfaces of the twisting rollers along the gap. At least one of the twisting rollers is a perforated hollow roller including an outer shell having a plurality of perforations on the entire outer surface thereof and a suction device for providing a suction force through the perforations, whereby staple fibers are twisted to form a yarn while being sucked and held on the yarn forming zone. A supporting system of the perforated twisting roller is such that a suction pipe, a part of which is accommodated in the outer shell and has a suction mouth extending close to an inside wall of the outer shell in the axial direction of the perforated roller, is fixedly secured to a machine frame; a beariung is fixedly accommodated in the suction pipe; and a shaft is rotatably supported by the bearing at one end portion thereof and is fixedly secured to the oute shell at the other end portion thereof.

5 Claims, 6 Drawing Figures

FRICTION SPINNING FRAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a friction spinning frame in which opened fibers supplied from a fiber transporting channel to a yarn formation zone formed on a valley-shaped surface between a pair of twisting rollers are twisted while held by suction on a surface of at least one of the twisting rollers, which rollers are arranged substantially in parallel to each other with a small gap therebetween and rotate in the same direction to each other, more specifically, to a supporting system of the twisting roller thereof.

2. Description of the Related Art

In the conventional apparatus of this type, the twisting roller is supported by a bearing mounted outside of a projected end portion of a shaft of the rollers. For example, Japanese Examined Patent Publication (Kokoku) No. 56-52134 discloses a supporting structure of the twisting roller. In this apparatus, one of the roller pair is a perforated hollow roller with a plurality of perforations and having a suction duct therein for providing a suction force on fibers supplied thereon. The roller is mounted for rotation to a frame by engaging a tubular shaft extending from an end of the roller with a bearing. According to the abovesaid structure, however, the bearing supporting the perforated roller engages in large relative movement, which causes significant heat generation, resulting in degradation of the lubricant, wear of the bearing, and large energy consumption.

Japanese Examined Patent Publication (Kokoku) No. 57-59328 discloses a supporting structure, in the friction spinning frame, for a solid roller, that is, a roller without suction means in the interior thereof. In this structure, the solid roller is supported by a relatively small bearing built therein. As the perforated roller which must inherently be provided with suction means in the interior, there are similar drawbacks as stated above.

SUMMARY OF THE INVENTION

It is an object of the present invention to eliminate the afore-mentioned drawbacks of the present invention.

It is another object of the present invention to provide a roller supporting structure of a compact size for a friction spinning frame.

The above objects are achievable by a friction spinning frame comprising a pair of twisting rollers disposed substantially in parallel and driven in the same direction to each other at a small gap therebetween to form a yarn forming zone of a valley shaped profile on upper surfaces of the twisting rollers along the gap, at least one of the twisting rollers being a perforated hollow roller comprising an outer shell having a plurality of perforations on the entire outer surface thereof and means for providing a suction force through the perforations on the yarn forming zone, whereby staple fibers are twisted to form a yarn while being sucked and held on the yarn forming zone. The spinning frame, according to the present invention, is characterized in that: a suction pipe, a part of which is accommodated in the interior of the outer shell and having a suction mouth extending close to an inside wall of the outer shell in the axial direction of the perforated roller is fixedly secured to a machine frame; a bearing is fixedly accommodated in the interior of the suction pipe; and a shaft is rotatably supported by the bearing at one end portion thereof and fixedly secured to the outer shell at the other end portion thereof.

The twisting rollers preferably comprise a combination of perforated and nonperforated rollers.

Alternatively, the twisting rollers may comprise a pair of perforated rollers.

In the combination of the perforated and nonperforated rollers, the nonperforated roller may be of a hollow shape comprising an outer shell and a supporting tube accommodated in the former while being fixedly secured to a machine frame. A bearing is accommodated in and fixedly secured to the interior of the supporting tube while rotatably holding a shaft fixedly secured to the outer shell, whereby the outer shell of the nonperforated roller is rotatably held around the supporting tube.

The supporting tube may be provided with a plurality of perforations on an outer surface thereof.

BRIEF DESCRIPTION OF THE DRAWINGS

Other objects and advantages of the present invention will be apparent from the following description with reference to the accompanying drawings illustrating the preferred embodiments of the present invention, wherein.

DESCRIPTION OF THE PREFERRED EMBODIMENTS

Figure 6:
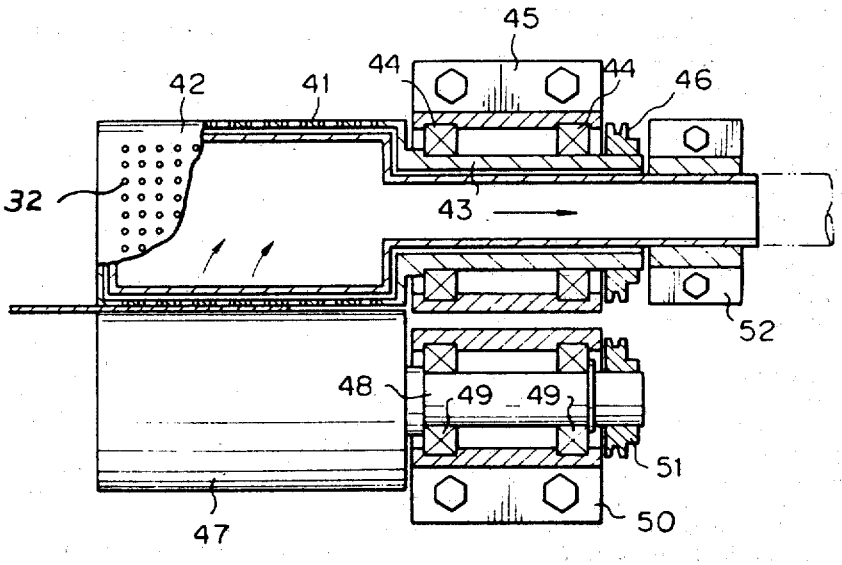
Fig. 6 PRIOR ART
FIG. 6 is a partially broken plan view of a conventional friction spinning frame.

Before explaining the preferred embodiments, the related art mentioned above will be clarified more with reference to FIG. 6. In FIG. 6, there is shown a perforated hollow roller 42 with a plurality of perforation 32 on an outer surface thereof and having a suction duct 41 therein for providing a suction force on fibers supplied thereon by an air flow sucked through the perforations. The roller 42 is mounted for rotation to a frame 45 by engaging a tubular shaft 43 extending from an end of the roller 42 with a bearing 44 and is driven through a pulley 46 secured to an end of the tubular shaft 43. On the other hand, another roller 47 disposed closely in parallel to the perforated roller 42 is mounted for rotation to a frame 50 by engaging a shaft 48 extending from an end of the roller 47 with a bearing 49 and is driven through a pulley 51 secured to an end of the shaft 48. The suction duct 41 is secured to a frame 52 positioned adjacent to the frame 45. According to the abovesaid structure, the bearing 44 for supporting the perforated roller 42 must be larger in size because the bearing 44 is engaged from outside with the relatively thick tubular shaft 43.

Figure 1:
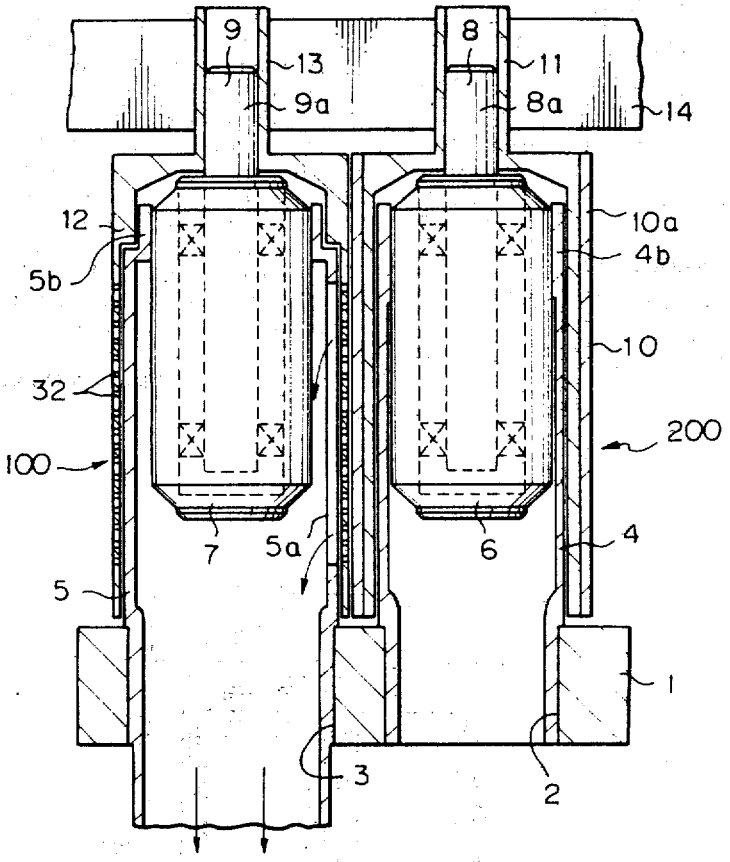
FIG. 1 is a side sectional view of a first embodiment of a friction spinning frame according to the present invention.
Figure 2:
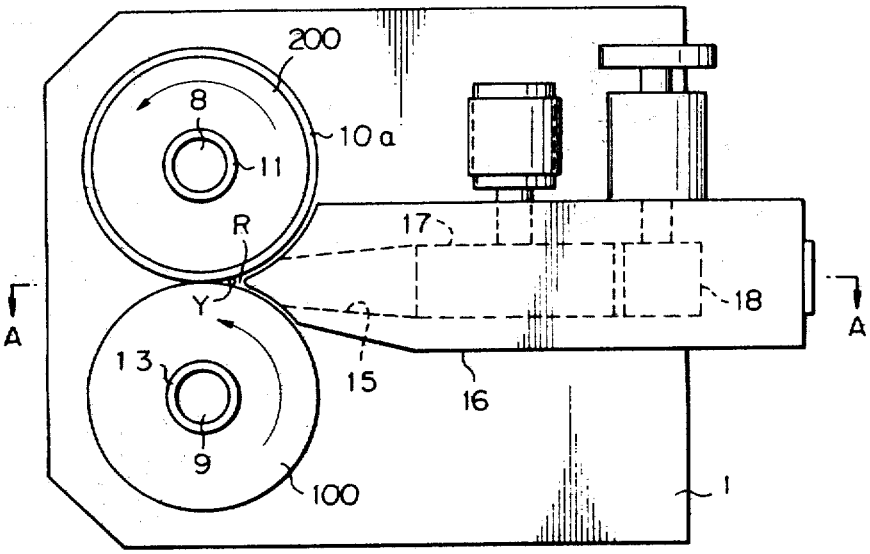
FIG. 2 is a plan view of the first embodiment of FIG. 1.
Figure 3:
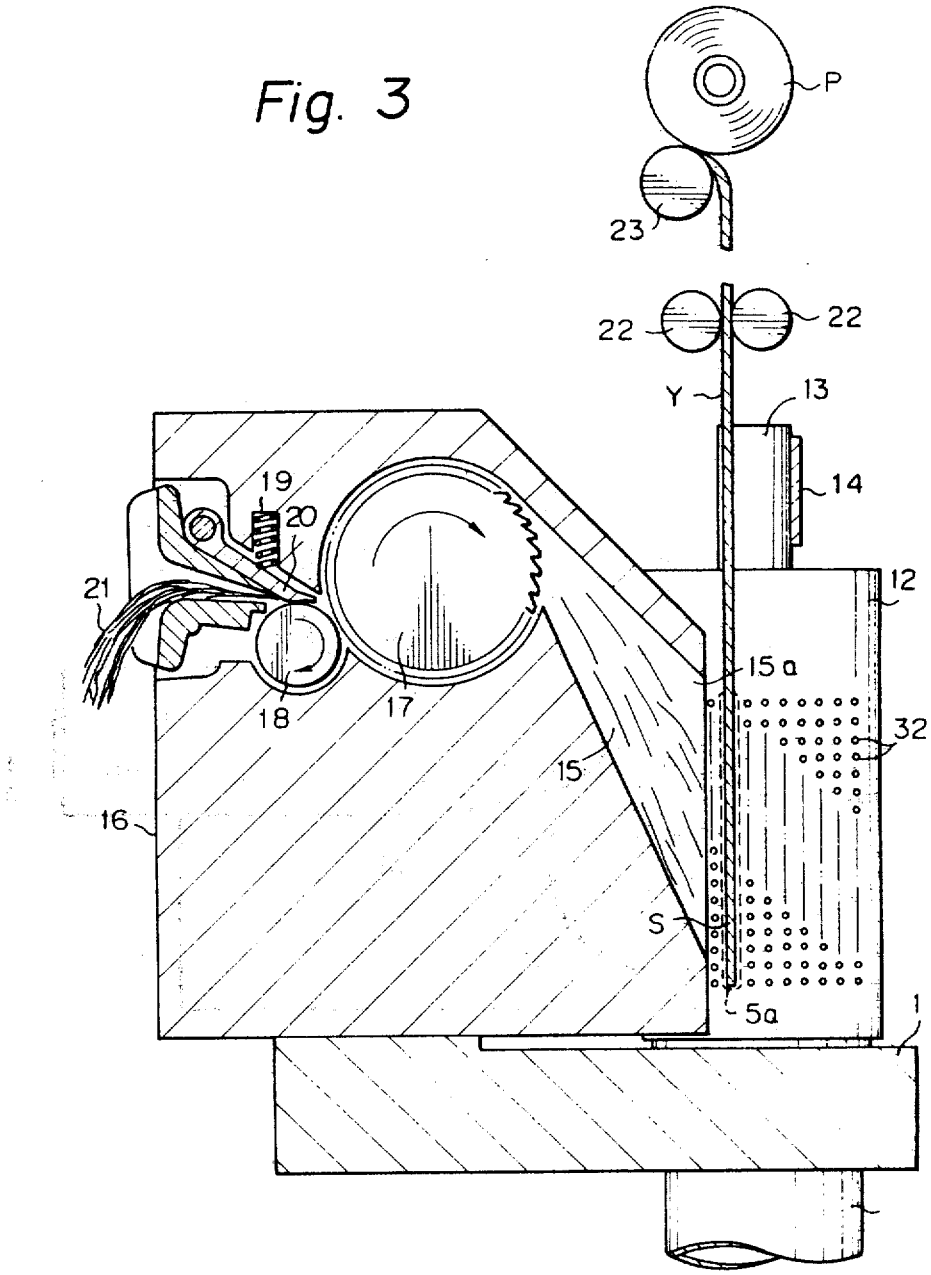
FIG. 3 is a sectional view of the first embodiment along line A—A in FIG. 1.

FIGS. 1 through 3 illustrate a first embodiment of a friction spinning frame according to the present invention.

The first embodiment basically has a structure similar to the conventional one as stated before except for a roller supporting system. That is, it comprises a pair of twisting rollers, a perforated roller 100 and a nonperforated roller 200, disposed close to and in parallel to each other. The perforated twisting roller 100 comprises an outer shell 12 provided with a plurality of perforations 32 on an outer surface thereof; a cylindrical suction pipe 5, an end portion of which is inserted in the interior of the outer shell 12 through a free open end thereof at a small gap between the inner wall of the outer shell 12 and the outer wall of the suction pipe 5 and the other end portion being connected to a suction source (not illustrated); a bearing 7 accommodated in the interior of the suction pipe 5 with an end of the bearing 7 being fixedly inserted in a neck portion 5b of the suction pipe 5; and a shaft 9 rotatably supported by the bearing 7 with an end portion 9a being projected from the bearing 7.

The outer shell 12 has a projected tubular portion 13 at an end opposite to the free end. The suction pipe 5 is fixedly inserted into an aperture 3 bored through a machine frame 1 at a portion opposite to the neck portion 5b. A suction mouth 5a of the suction pipe 5 of narrow width is provided on the outer wall thereof close to and along substantially the entire length of the inner wall of the outer shell 12 in the axial direction of the perforated roller 100.

The shaft 9 and the outer shell 12 are fixedly secured to each other by firmly inserting the projected end portion 9a of the shaft 9 into the projected tubular portion 13 of the outer shell 12.

The nonperforated twisting roller 200 is constituted in a similar manner as the perforated twisting roller 100. The nonperforated twisting roller 200 comprises an plain outer shell 10 covered with an elastic layer such as polyurethane; a hollow cylindrical supporting member 4, an end portion of which is inserted in the interior of the outer shell 10 through a free open end thereof at a small gap between the inner wall of the outer shell 10 and the outer wall of the supporting member 4; a bearing 6 accommodated in the interior of the supporting member 4 with an end of the bearing 6 being fixedly inserted in a neck portion 4b of the supporting member 4; and a shaft 8 rotatably supported by the bearing 6 with an end portion 8a being projected from the bearing 6.

The outer shell 10 has a projected tubular portion 11 at an end opposite to the free end. The supporting member 4 is fixedly inserted into an aperture 2 bored adjacent to the aperture 3 through the machine frame 1 at a portion opposite to the neck portion 4b.

The shaft 8 and the outer shell 10 are fixedly secured to each other by firmly inserting the projected end portion 8a of the shaft 8 into the projected tubular portion 11 of the outer shell 10.

The twisting rollers 100 and 200 are driven in the same direction by a common belt 14 running tangentially to the outer surfaces of the projected tubular portions and 13.

As shown in FIGS. 2 and 3, a fiber delivery device 16 is provided above the twisting rollers 100 and 200, comprising a fiber transporting channel 15 having a tip end of a shape complementary to a V-shaped space (a yarn forming zone) R between the twisting rollers 100 and 200. A sliver 21 is introduced in the fiber delivery device 16 while being nipped between a fluted roller 18 and a presser 20 urged onto the former by a spring 19, in which the sliver 21 is opened to individual fibers by high speed rotation of a combing roller 17 and fed to the yarn forming zone R through the fiber transporting channel 15. A yarn withdrawing device comprising a pair of delivery rollers 22 and a winding drum 23 is provided in the axial direction of the yarn forming zone R.

The operation of the abovesaid embodiment of the present invention will be described as follows:

The opened fiber fed from the fiber delivery device 16 to the fiber transporting channel 15 flies therethrough by an air flow caused by a suction of the suction pipe 5 to an outlet 15a and is deposited to form a fiber bundle S on the surface of the outer shell 12 of the perforated roller 100 corresponding to the position of the suction mouth 5a of the suction pipe 5. The fiber bundle S is rotated about its own axis by the same directional rotation of the twisting rollers 100 and 200 and friction between the fiber bundle S and the surfaces of the outer shell 10 and 12, whereby a twist is inserted into the fiber bundle to form a yarn Y. The yarn Y is finally withdrawn from the yarn forming zone R by the delivery rollers 22 and is taken up as a package P by the drum 23.

According to this embodiment of the present invention, the bearings 6 and 7 of the twisting rollers 100 and 200 become smaller in size relative to the conventional ones because the bearings are accommodated in the interior space of the twisting rollers, which can minimize the relative motion of the bearings. In addition, since the bearing 7 supporting the shaft 9 of the perforated twisting roller 12 is always cooled by an air flow introduced in the interior of the suction pipe 5 through the suction mouth 5a of the suction pipe 5, temperature elevation of the bearing due to the high speed rotation of the twisting roller 100 can be prevented. Thus, deterioration of the lubricant and also wear of the bearing are minimized.

Figure 4:
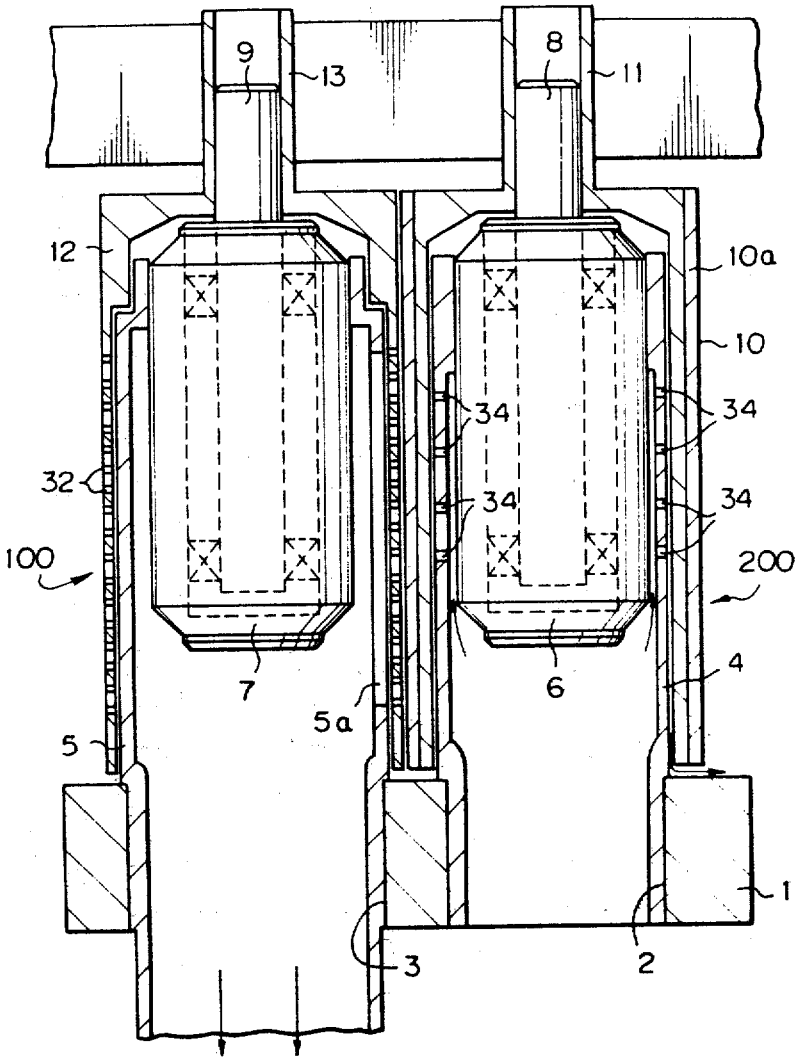
FIG. 4 is a side sectional view of a second embodiment of a friction spinning frame according to the present invention.

A second embodiment of the present invention is illustrated in FIG. 4, in which the supporting member 4 of the nonperforated twisting roller 200 is provided with a plurality of apertures 34 on the outer surface of the supporting member 4 for sucking air through a gap between the outer wall of the supporting member 4 and the inner wall of the shell 10. According to this embodiment, during a spinning operation, an air flow to the outside is generated in the nonperforated twisting roller 200 along an arrow shown in FIG. 4, whereby air around the bearing 6 is always ventilated and cooling of the bearing 6 is resulted. To enhance the ventilation effect, a plurality of grooves may be provided on the inner surface of the outer shell of the nonperforated twisting roller.

Figure 5:
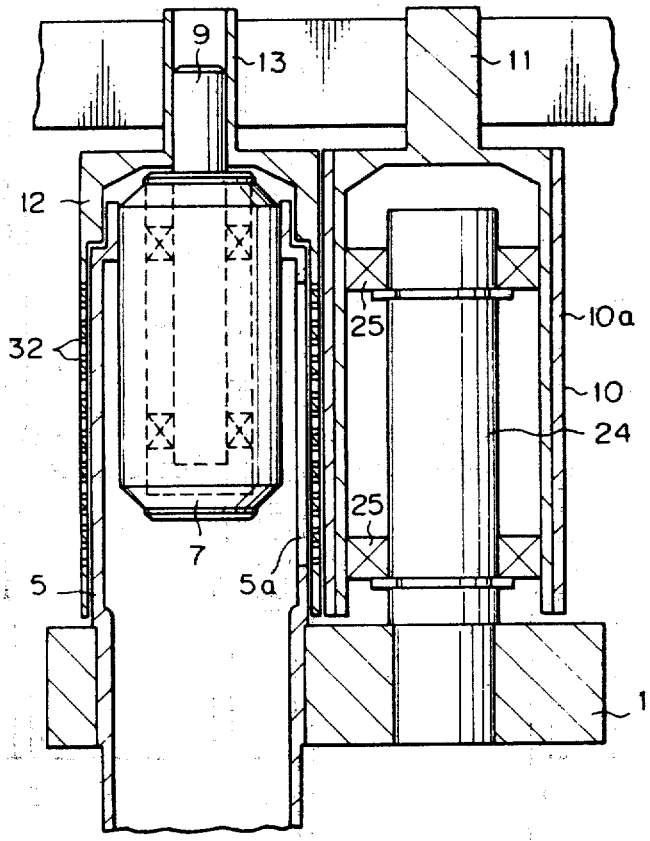
FIG. 5 is a similar view to FIG. 1 illustrating a modification of the first embodiment.

A modification of the first embodiment is shown in FIG. 5, in which a shaft 24 for supporting the nonperforated twisting roller 200 is directly fixed at one end portion thereof to the machine frame 1 and a bearing 25 fixed in the interior of the outer shell 10 is rotatably mounted on the shaft 24. In this case, the projected portion 11 of the outer shell 10 is not necessarily tubular but may be solid.

In another modification (not shown), both twisting rollers may be perforated in the outer shells and provided with a respective suction pipe therein.

Instead of engaging the belt 14 with the projected tubular portions 11 and 13 of the outer shells 10 and 12 as shown in FIG. 1, the belt may be engaged directly with the end portions of the shafts exposed outside from the ends of the outer shells or with the periphery of pulleys attached to the ends of the projected tubular portions or the shafts. In the latter case, the rotational speed of the twisting rollers can be easily varied by changing the diameter of the pulley.

We claim:

1. A friction spinning frame comprising a pair of twisting rollers disposed substantially in parallel and driven in the same direction to each other at a small gap therebetween to form a yarn forming zone of a valley shaped profile on upper surfaces of said twisting rollers along the gap, at least one of said twisting rollers being a perforated hollow roller comprising an outer shell having a plurality of perforations on the entire outer surface thereof and means for providing a suction force through said perforations on said yarn forming zone, whereby staple fibers are twisted to form a yarn while being sucked and held on said yarn forming zone, characterized in that:

a suction pipe, a part of which is accommodated in the interior of said outer shell and having a suction mouth extending close to an inside wall of said outer shell in the axial direction of said perforated roller is fixedly secured to a machine frame;

a bearing is fixedly accommodated in the interior of said suction pipe; and a shaft is rotatably supported by said bearing at one end portion thereof and fixedly secured to said outer shell at the other end portion thereof.

2. A friction spinning frame defined by claim 1 characterized in that said twisting rollers are a combination of perforated and nonperforated rollers.

3. A friction spinning frame defined by claim 2, characterized in that said nonperforated roller is of a hollow shape comprising an outer shell and a supporting tube accommodated in said outer shell while being fixedly secured to a machine frame, a bearing being accommodated in and fixedly secured to the interior of said supporting tube while rotatably holding a shaft fixedly secured to said outer shell, whereby said outer shell of said nonperforated roller is rotatably held around said supporting tube.

4. A friction spinning frame defined by claim 3, characterized in that said supporting tube is provided with a plurality of perforations on an outer surface thereof.

5. A friction spinning frame defined by claim 1, characterized in that said twisting rollers are a pair of perforated rollers.

* * * * *